(12) United States Patent
Mohindra et al.

(10) Patent No.: US 6,356,964 B1
(45) Date of Patent: Mar. 12, 2002

(54) METHOD AND APPARATUS FOR ENABLING LOCATION-INDEPENDENT AND LOCATION-TRANSPARENT INTERACTION BETWEEN A PROGRAM AND A USER

(75) Inventors: Ajay Mohindra, Yorktown Heights; Apratim Purakayastha, Elmsford, both of NY (US); David Michael Shofi, Stamford, CT (US); William Harold Tetzlaff, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,892

(22) Filed: Aug. 31, 1998

(51) Int. Cl.⁷ .............................................. G06F 13/00
(52) U.S. Cl. ..................... 710/100; 709/203; 709/249; 707/10
(58) Field of Search ........................ 710/100; 455/414, 455/412; 709/203, 249, 201, 202, 229; 707/10

(56) References Cited

U.S. PATENT DOCUMENTS

| | | | |
|---|---|---|---|
| 5,790,800 A | * | 8/1998 | Gauvin et al. .............. 709/227 |
| 5,854,887 A | * | 12/1998 | Kindell et al. ................. 348/7 |
| 5,892,905 A | * | 4/1999 | Brandt et al. ................ 713/201 |
| 6,018,654 A | * | 1/2000 | Valentine et al. ........... 455/414 |
| 6,029,064 A | * | 2/2000 | Farris et al. ................. 455/412 |
| 6,125,384 A | * | 9/2000 | Brandt et al. ................ 709/203 |
| 6,134,673 A | * | 10/2000 | Chrabaszcz |
| 6,144,990 A | * | 11/2000 | Brandt et al. |

* cited by examiner

Primary Examiner—Ayaz Sheikh
Assistant Examiner—Furmin Backer
(74) Attorney, Agent, or Firm—Gail H. Zarick; David M. Shofi; Anne Vachon Dougherty

(57) ABSTRACT

A system and method wherein a mobile user, or a user interacting with a mobile program, can at any time initiate a program status request. The program status request initiates the sequence of events whereby the current location of the program is determined and/or the current user location is made available to the program without the necessity of either entity changing location. Further, the agent script for the program maintains a composite data structure which includes an input buffer for storing input variables, an output buffer for storing output values to be displayed to the user, a program state data structure, and an optional bag buffer for temporarily storing input variables which the program will need in the course of future execution. By maintaining such a composite data structure, it is assured that all necessary information can be provided at a program location regardless of whether the program or the user has relocated.

17 Claims, 9 Drawing Sheets

METHOD AND APPARATUS FOR ENABLING LOCATION-INDEPENDENT AND LOCATION-TRANSPARENT INTERACTION BETWEEN A PROGRAM AND A USER

FIELD OF INVENTION

The present invention relates to input and output functions of computer programs. More specifically, the present invention is related to enabling location independent and location transparent interaction between a program and a user, one or both of which is mobile.

BACKGROUND OF THE INVENTION

To support interaction between a user and a program, current systems require the program and the user to be constantly aware of each other's location. If a program, such as a mobile agent program, moves to a different host, it must return to the user location or communicate through another program at the user location, to receive input or display output to the user. This is a problem when the user is mobile (e.g., using a laptop or handheld device) and, therefore, usually not in the original location from which the program was launched. Similarly, if a user chooses to move to another location on a network, that user must access the machine at which the program is executing in order to provide input or to receive output from the program.

In prior art systems, interactions between a program and a user are handled using standard input and output constructs. For example, in C programming language the input construct is the "scanf( )" function and the output construct is the "printf( )" function. In Java language, the input is performed using methods in classes such as "java.io.InputStreamReader" and "java.io.InputStream," while output is performed using methods in classes such as "java.io.PrintWriter" and "java.io.PrintStream." For such programs, both the user and the program must be at the same location.

In conventional mobile agent systems, such as those described in U.S. Pat. No. 5,603,031, issued Feb. 11, 1997, entitled "System and Method for Distributed Computation Based Upon the Movement, Execution, and Interaction of Processes in a Network," by White et al. and "IBM Aglets Workbench—Programming Mobile Agents in Java", Proceedings of 1997 World Wide Computing and Its Applications, Japan, pp. 253–266 by Lange et al., the program executes part of its code at one host location, then moves to another host location where it executes a next portion of code, and so on. Interaction between a mobile agent and a user in such a system is achieved by the agent moving to and executing at the user's machine when display of data to the user and/or receipt of input from the user is required.

The conventional systems have three main limitations. First, both the program and the user have to be aware of each others' location at all times. Second, in situations where a program must move to the location of a user, the user's machine must have a program execution environment available to host and execute the program at any time. Third, while mechanisms exist to supply initialization parameters to a program before it begins execution, after the program has started execution, there are no mechanisms in these systems to permit a user to both determine the status of the program and to provide input to the program during program execution and/or before the program asks for them.

An object of the present invention is to provide a system and method for permitting input and output between a user and a program without the requirement of each entity constantly maintaining knowledge of the other entity's location.

Another object of the present invention is to provide a system and method for permitting input and output between a user and a program without requiring the user's machine to have an execution environment available in which the program can run.

Another object of the present invention is to provide for a user to both determine the status of a mobile program during execution and supply input to a program during execution and before input is actually needed.

SUMMARY OF THE INVENTION

These and other objects of the invention are realized by the present invention comprising a system and method wherein a mobile user, or a user interacting with a mobile program, can at any time initiate a program status request. The program status request initiates the sequence of events whereby the current location of the program is determined and/or the current user location is made available to the program without the necessity of either entity changing location. Further, the agent script for the program maintains a composite data structure which includes an input buffer for storing input variables, an output buffer for storing output values to be displayed to the user, a program state data structure, and an optional bag buffer for temporarily storing input values which the program will need in the course of future execution. By maintaining such a composite data structure, it is assured that all necessary information can be provided at a program location regardless of whether the program or the user has relocated.

BRIEF DESCRIPTION OF THE DRAWING

The present invention will be understood by reference to the drawing, wherein.

DETAILED DESCRIPTION OF THE PREFERRED EMBODIMENT

The following are definitions of some of the terms used in this specification:

A host or host machine is a computing system, such as a mainframe, desktop personal computer, portable laptop computer or handheld device on which a program is executing.

A network is a set of hosts, interconnected by some physical and logical communications infrastructure.

A user is a human user of the network environment.

A client is the user's interface to a network and may be a computer, handheld portable device, or other device having communication capabilities.

A program is a sequence of instructions that execute on a host machine.

A mobile program is a program, such as a mobile agent, that moves from one host machine to another, executing some of its instructions at each host machine.

An Agent Server is a host machine having the execution environment for a mobile agent.

An Agent Execution Shell (AES) is a software subsystem at a host's Agent Server in which a mobile agent executes part of its instructions.

The preferred embodiment is described in the context of a program that is mobile such as a mobile agent.

Figure 1:
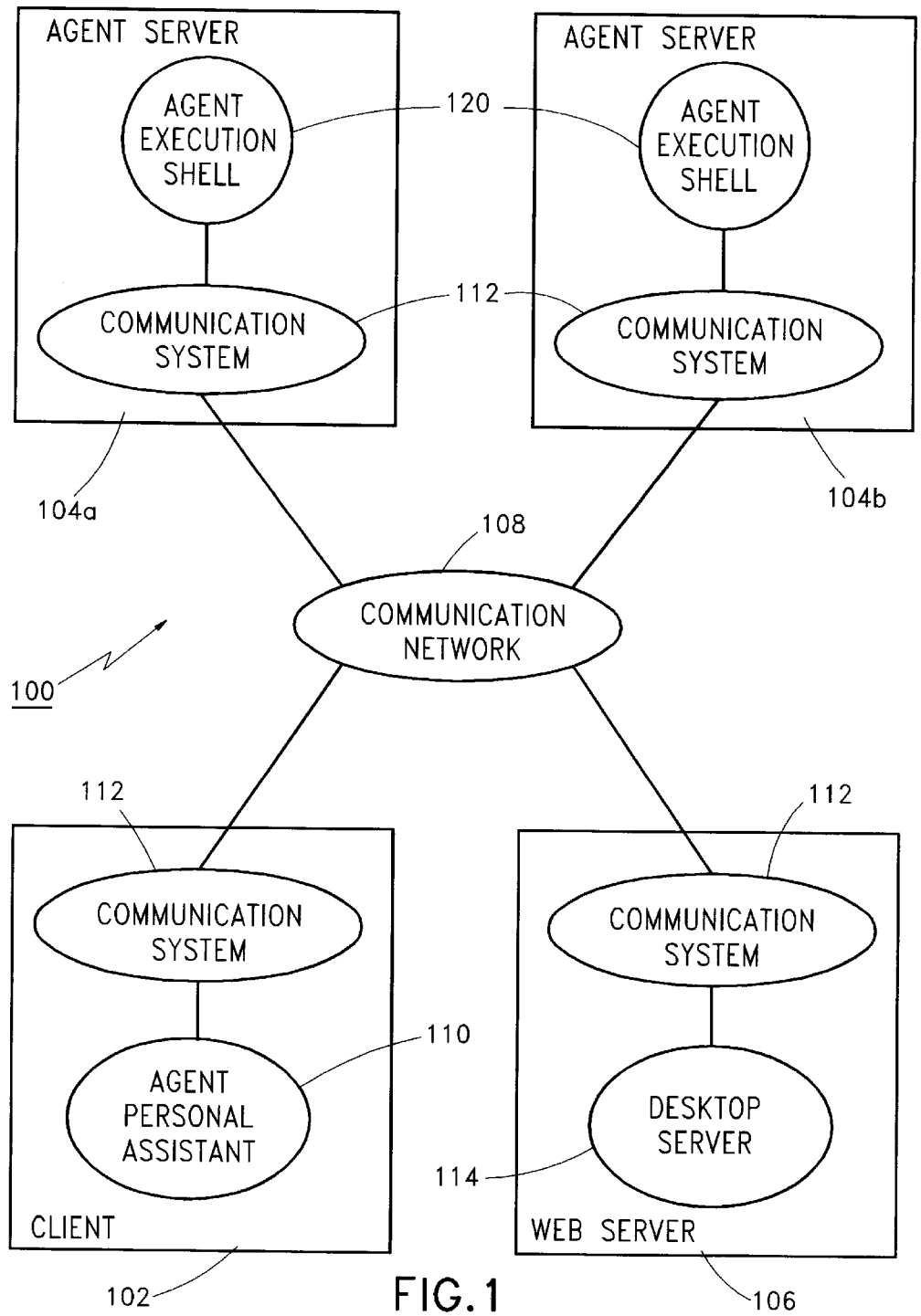
FIG. 1 shows a networked system into which the present invention can be incorporated.

FIG. 1 depicts a system into which the features of the present invention can be incorporated. Here, a networked system 100 connects computers that have distinct roles in the system. The computers 102, 104a, 104b and 106, which can be running conventional operating systems such as OS/2, UNIX, AIX or Windows NT, are interconnected by way of a communication network 108 in conjunction with a communication protocol. The communication protocol can be, for example, Sun Microsystems RPC, which can run on UDP/IP or TCP/IP. The network 108 can be a LAN, Internet or intranet. The client 102 and Agent Servers 104a, 104b can be embodied by conventional personal computers (PCs) such as IBM PCs. On each computer, there is a conventional communication system 112, such as the TCP/IP stack in the operating system, that is used to communicate over the network 108. Alternatively, clients also can be embodied as handheld portable mobile devices, such as a PalmPilot or a smart cellular telephone. These mobile devices can run proprietary operating systems using cellular telephone technology, infrared communication means, or other equivalent means, to connect to the communication network 108. Note that the distinction between a client 102 and an Agent Server 104a, 104b may be logical or physical and that the client need not be able to provide an execution environment for the relevant program.

Although only one client is shown in FIG. 1, there can be many clients in the system 100. An agent program is launched from a client machine 102, using a subsystem called the Agent Personal Assistant (APA) 110. In addition to agent launch, this subsystem is capable of debugging, updating and checking agent status. Such a subsystem is disclosed in U.S. Pat. No. 6,055,562 of Devarakonda et al, entitled, "Dynamic Mobile Agents," issued Apr. 25, 2000. In the present invention, it is preferable that the APA 110 be embodied as an application with a web interface. The APA 110 interacts with a Desktop Server 114, located within a Web Server 106, to perform these tasks.

There can be a plurality of Agent Servers in the system 100. Each of the Agent Servers 104a, 104b supports an execution environment that includes a software subsystem referred to as an Agent Execution Shell (AES) 120. This AES 120 acts as the single coordinator for agent execution and maintains an internal table containing the state of all currently active agents. Each Agent Server additionally maintains at least one routing table for recording the locations(s) from and to which mobile agents move.

Figure 2:
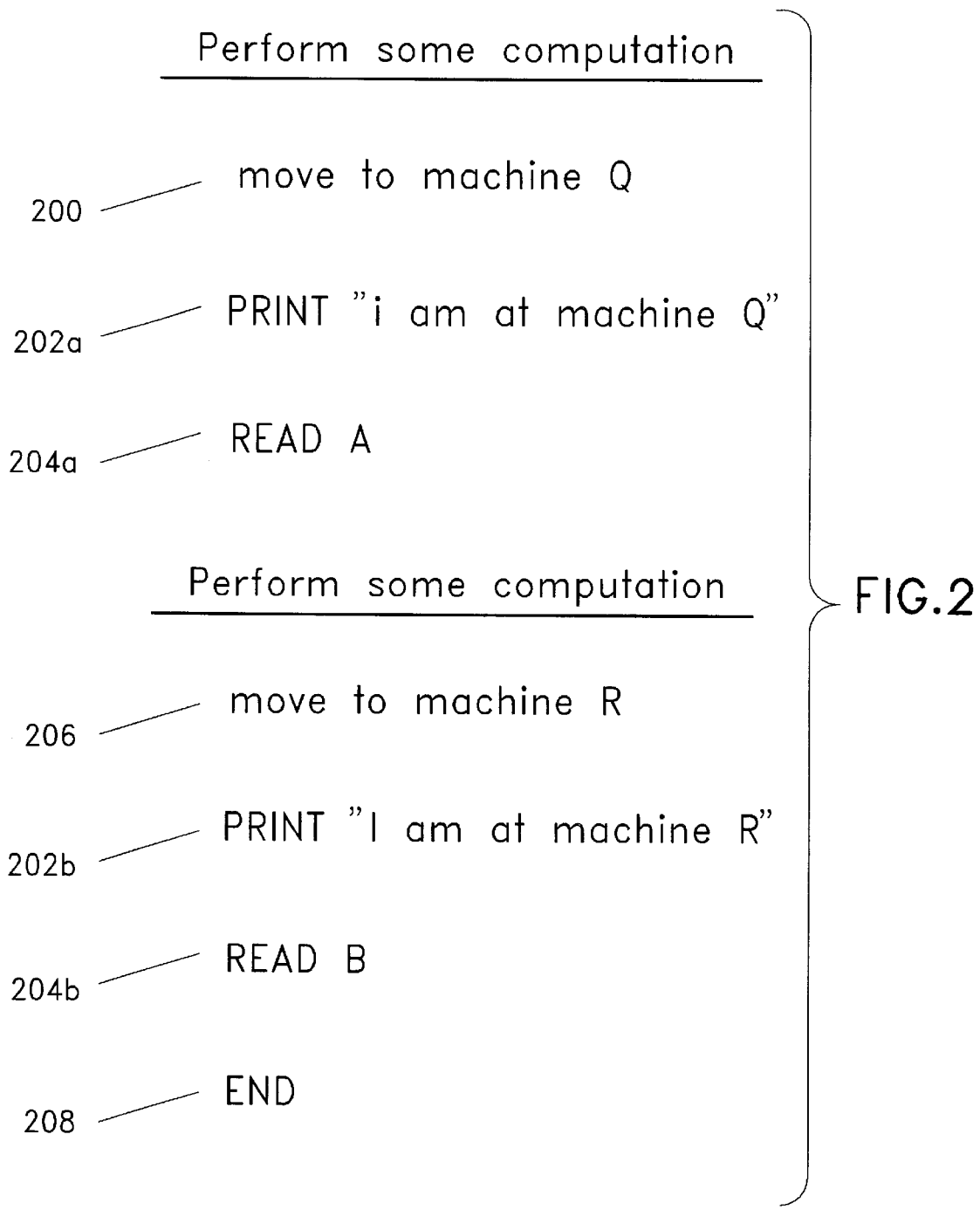
FIG. 2 shows an example of an agent script with input and output statements.

FIG. 2 shows a typical example of agent code to be used with the present invention. After performing some computation on a machine, the agent moves to the next host machine Q at step 200. The next host may be specified in the code or may be dynamically determined as discussed in the aforementioned patent application, the disclosure of which is hereby incorporated by reference. The agent code may contain the construct PRINT for providing output and the construct READ for reading input values from machine Q. As illustrated, at step 202a, the PRINT construct enables the agent to display results to a user, while the READ construct, at step 204a, enables the agent to request input from a user. After performing its computation as required, such as executing the READ, PRINT or other instruction, the agent moves to machine R at line 206. Again, the agent code may contain a PRINT construct and a READ construct, which may be executed at 204a and 204b, respectively. The code completes execution at step 208.

Figure 3:
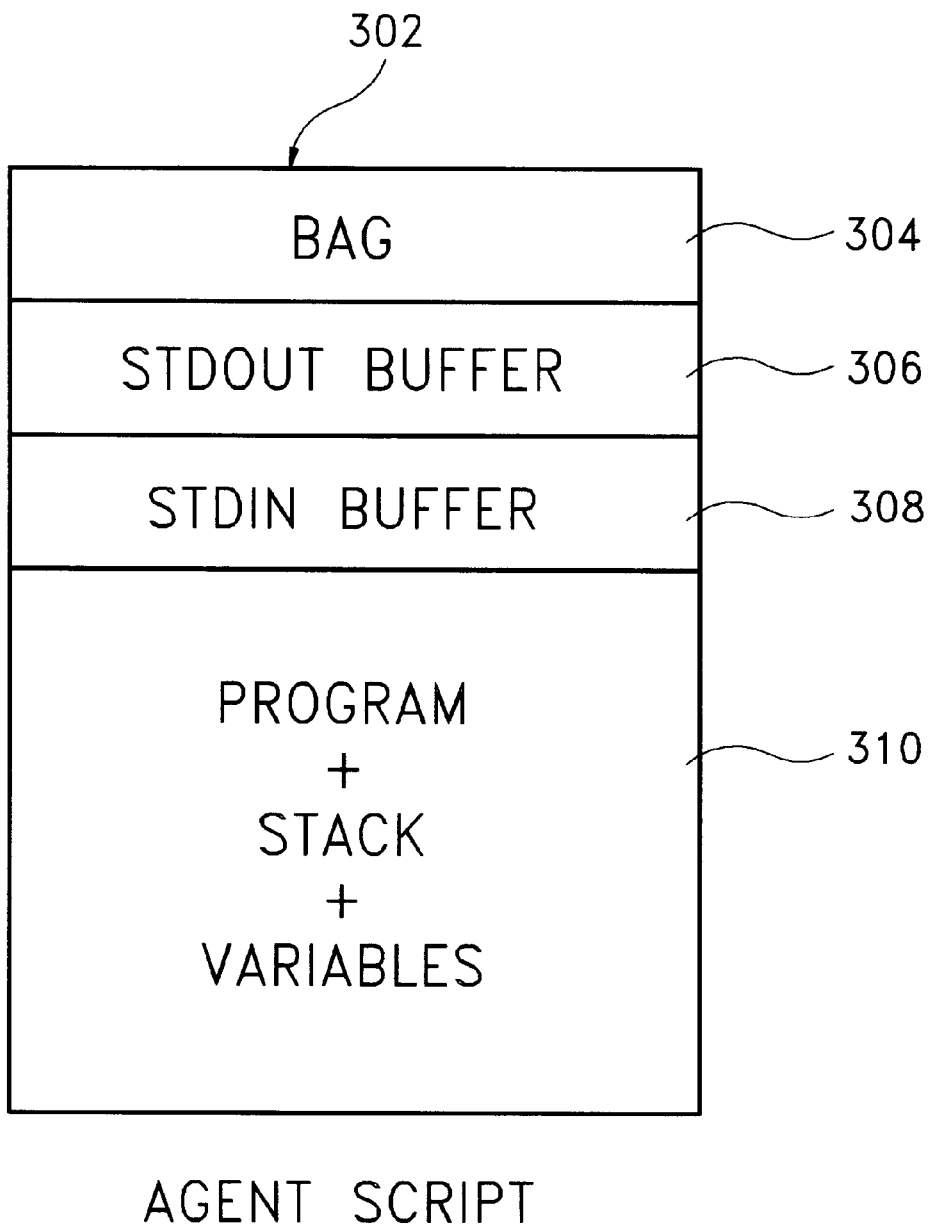
FIG. 3 shows an embodiment of the relevant data structures of a mobile agent script according to an aspect of the present invention.

FIG. 3 shows a composite data structure associated with an agent script 302 as it moves through the network 108 in accordance with the present invention. While the contents of the components of the composite data structure change as the agent script moves, the data structure components, including bag 304, STDOUT 306, STDIN 308, and program state 310 remain available. A "bag" 304 is a buffer that contains a set of variable name/value pairs which have been preset or input dynamically for future program usage. When the program requires input, the agent script examines the contents of the bag to locate values for variables and then retrieve the values. The value for a particular variable name could be a set of values that would be returned sequentially for successive requests for the same name. If the bag does not contain a value for the needed variable, the agent script blocks and waits for the user to input the needed data. The bag buffer may be implemented as an array, hash table, tuple space, or other equivalent data structure. "STDOUT" buffer 306 contains all the output generated by an agent. The contents of the STDOUT buffer 306 are displayed to the user when requested. "STDIN" buffer 308 contains the variable names for which an agent script is awaiting input values from the user. The "STDIN" buffer 308 is used by the AES 120 to communicate values for input variables to the agent script. Finally, program, stack and variable data structures are included for representing the program state 310 of the agent script.

Figure 4:
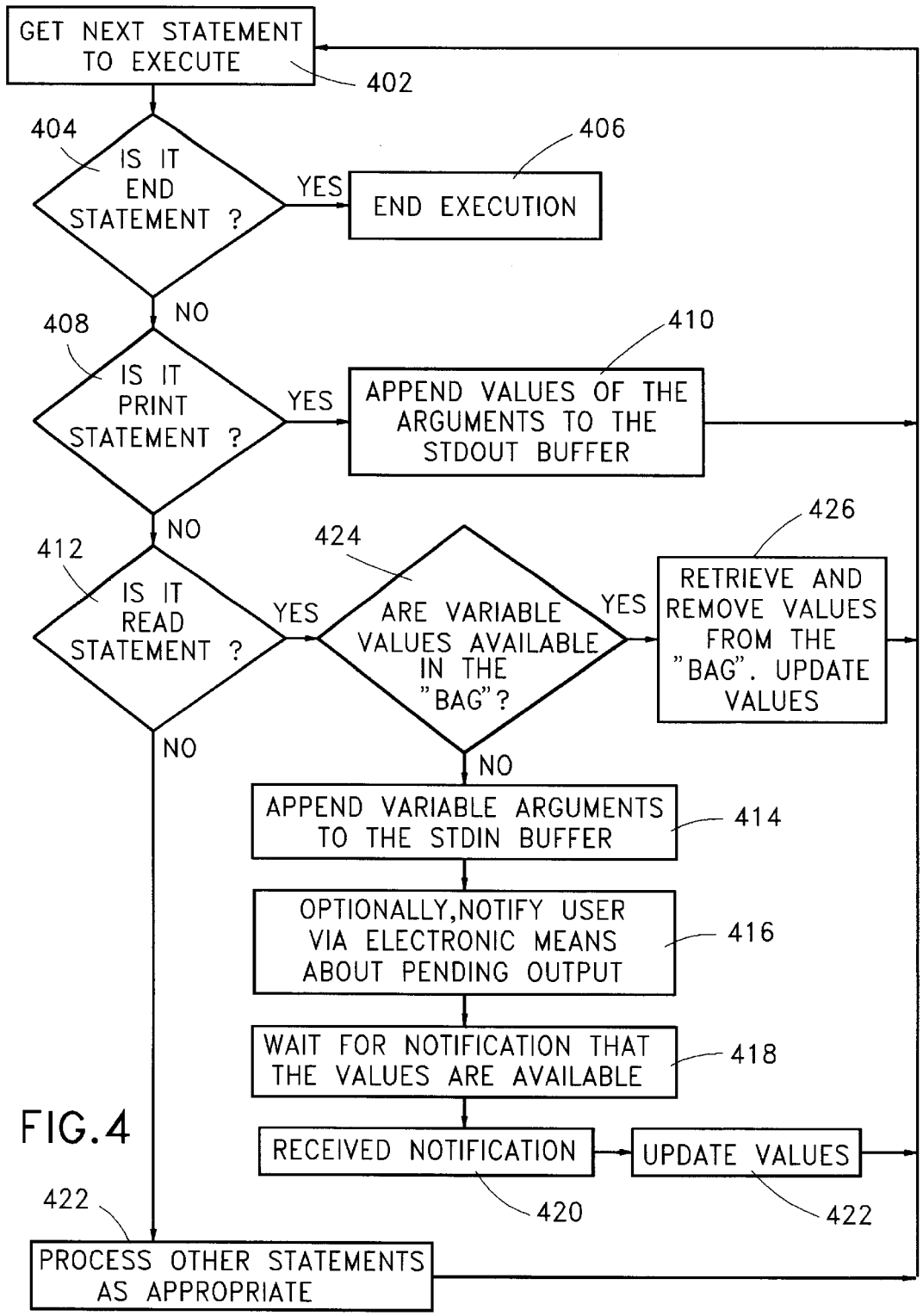
FIG. 4 shows an embodiment of the logic of the present invention for handling input and output by the Agent Execution Shell of the system of FIG. 1.

FIG. 4 shows the method steps performed by an embodiment of the AES 120 when executing program statements of the agent. Only statements relevant to the present invention are shown in FIG. 4. In step 402, the AES 120 examines the next statement to execute. In step 404, the AES 120 determines if the statement is the END statement. If it is the END statement, the AES terminates execution of the agent at step 406. If the next statement is not the END statement, the AES 120 determines if the statement is a PRINT statement at step 408. If the next statement is a PRINT statement, the AES 120 retrieves values for the arguments to the PRINT statement from the program state 310 and appends the values to the STDOUT buffer 306 in a pre-determined format in step 410. A STDOUT buffer 306 is associated with each agent. The AES 120 then continues with the execution of the agent by returning to step 402.

If, in step 408, it is concluded that the statement is not a PRINT statement, the AES 120 next determines, in step 412, if the statement is a READ statement. If, in step 412, it is determined that the statement is a READ statement, then the AES 120 checks whether the needed variable values are available in the bag 304 in step 424. If the values are available, the values are retrieved and removed from the bag 304 in step 426. The variables are updated, and the AES 120 continues execution of the program by returning to step 402. If, in step 424, it is determined that the values are not available, the AES 120 appends the names of the arguments for the READ statement to the STDIN buffer 308 in step 414. Optionally, in step 416, the AES 120 then notifies the user via electronic means such as pager/beeper/electronic mail that input is required. The preference to be notified can be specified by the user when the agent script is launched.

Figure 5:
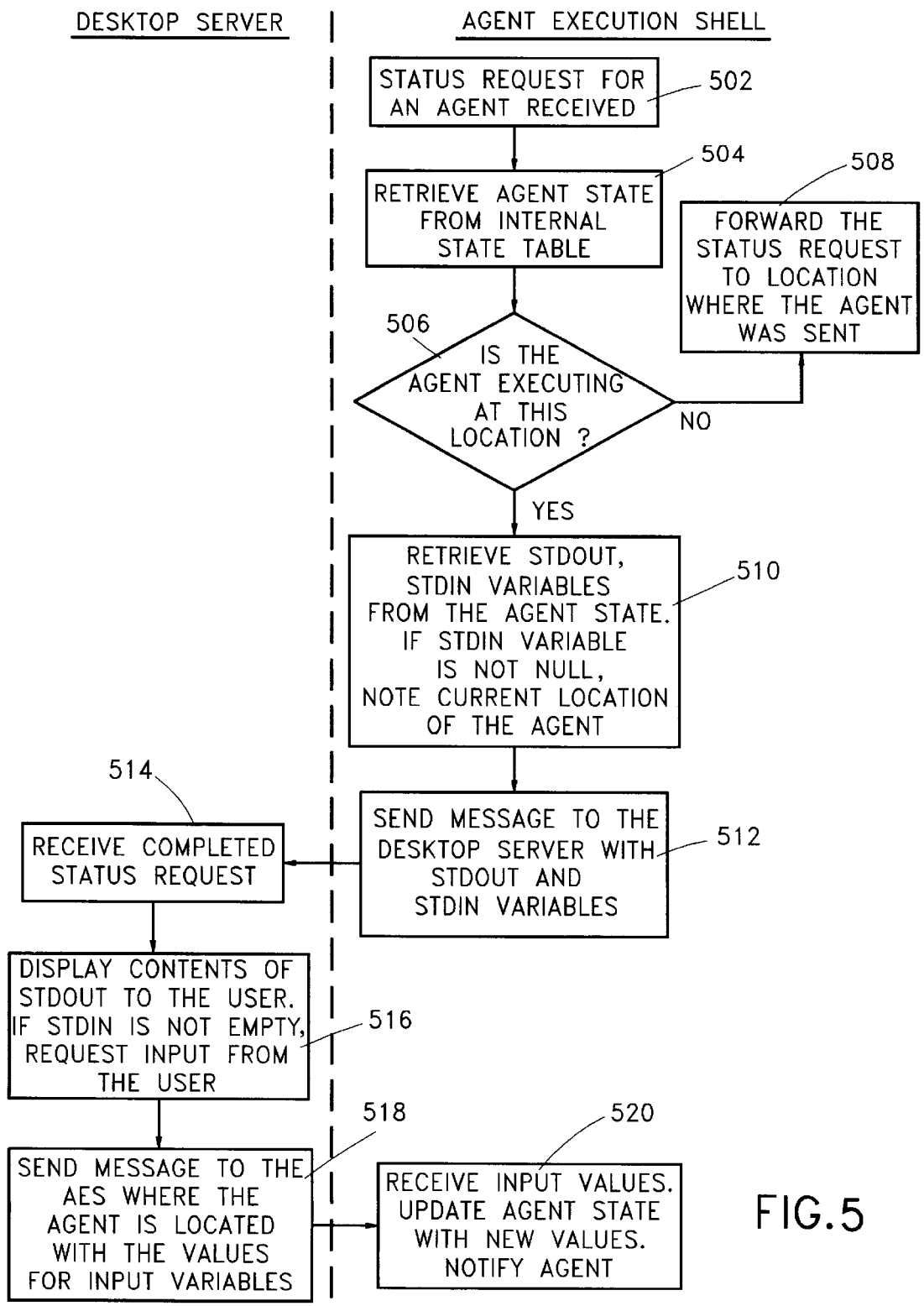
FIG. 5 shows an embodiment of the logic of the present invention for processing a user's request for status.

In step 418, the AES 120 suspends execution of the program and waits for notification that the input values are available. The logic for notifying the AES 120 about input values is shown in FIG. 5, described hereinbelow. After the AES 120 receives notification in step 420, the AES 120 updates the program state 310 with new values in step 422, and continues with execution of the program by returning to step 402. The AES may additionally update the bag contents if the user has provided input which the user knows will be required by the program in succeeding steps. If, in step 412, it is determined that the statement is not a READ statement, the AES 120 processes other statements as appropriate, in step 422, and continues execution of the program by returning to step 402. In one optimized embodiment, the entire contents of the bag could be consumed at one time (assuming that the bag contains more than just the immediately-required input) and utilizes the consumed input as required without having to re-examine the bag content at each input juncture of program execution.

FIG. 5 shows the steps through which a user interacts with an agent in an embodiment of the present invention. A user initiates a status request for an agent from the APA 110. The request is forwarded by the APA 110 to the Desktop Server 114 at the Web Server. The Desktop Server 114 then forwards the request as a STATUS request to the AES 120 at the Agent Server where the agent was initially launched. The AES 120, in step 502, receives the STATUS request forwarded by the Desktop Server 114. The AES 120 next retrieves the agent state from the internal state table, in step 504. The AES 120 then determines if the agent is still executing at the present location, in step 506. If the agent is no longer executing at the present location, the AES 120 checks its routing table and then, in step 508, forwards the STATUS request to the site where the agent was sent (and the method resumes with step 502 at the next machine).

If it is determined, in step 506, that the agent is currently executing at the present site, the AES 120 retrieves, in step 510, the STDOUT buffer 306 and the STDIN buffer 308, each associated with the agent state. If the STDIN buffer is not empty, such that input is required, the AES additionally notes the current logical address of the agent. In step 512, the AES 120 sends a message to the Desktop Server 142 containing the STDOUT and STDIN buffers 306, 308. If the STDIN buffer 308 is not empty, the AES 120 also sends the current logical address of the agent in the message, so that user input can be properly routed.

In step 514, the Desktop Server 114 receives a reply for the STATUS request. The Desktop Server 114 extracts the contents of the STDOUT and STDIN buffers from the message. In step 516, the Desktop Server 114 displays the contents of the STDOUT buffer to the user via the APA 110. If the STDIN buffer was not empty, the Desktop Server 114 also requests input from the user. Upon receipt of user input, the Desktop Server 114 sends a message to the AES 120 where the agent is currently located, at step 518. The AES 120 receives the message, at step 520, notifies the agent of the new values, and updates the buffers as necessary. As described in FIG. 4, the agent resumes execution after receiving the notification.

Figure 6A:
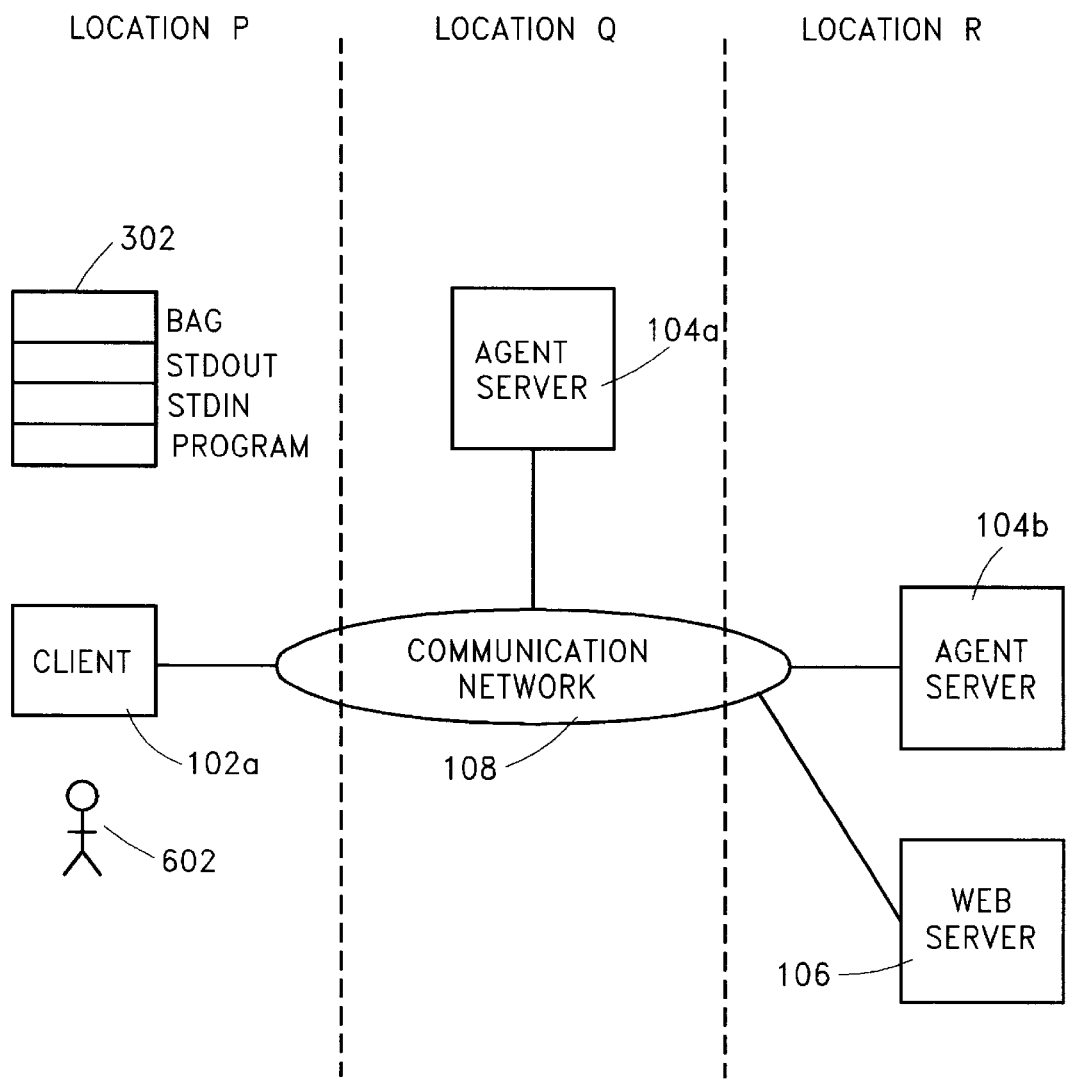
FIGS. 6a, 6b, 6c and 6d show an example scenario in which a user launches the script from one geographic location and, while moving, continually monitors the program, views results of the program and supplies input values as needed.

FIGS. 6a–d show a representative process flow for the present invention based upon the sample script in FIG. 2. In FIG. 6a, a user 602 at Location P launches a mobile script 302 from client machine 102a onto the communication network 108 which spans Locations P, Q, and R. The Agent Server 104a is disposed at Location Q. The Agent Server 104b and the Web Server 106 are disposed in Location R. After performing some computation, the mobile script 302 moves to location Q.

Figure 6B:
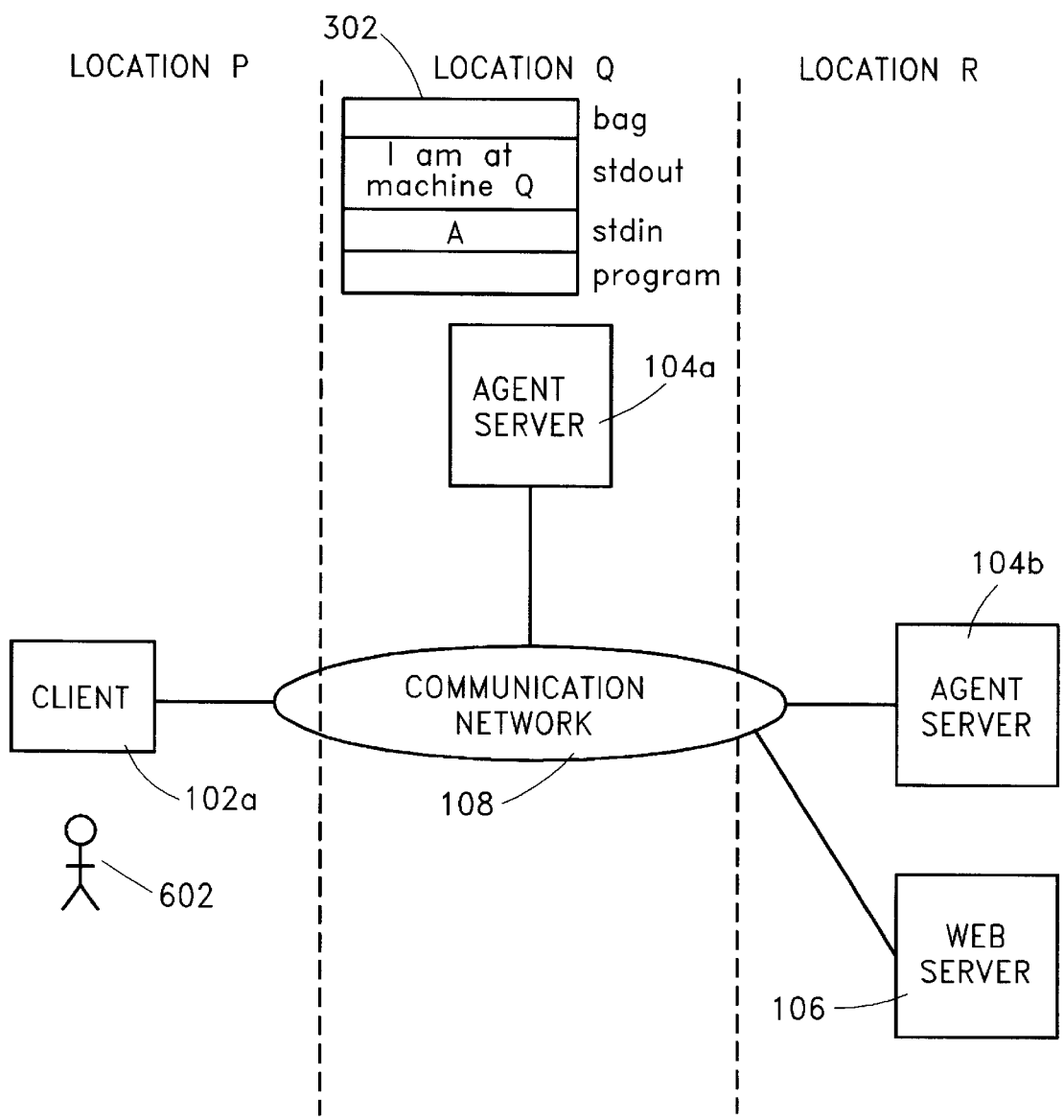
Figure 6C:
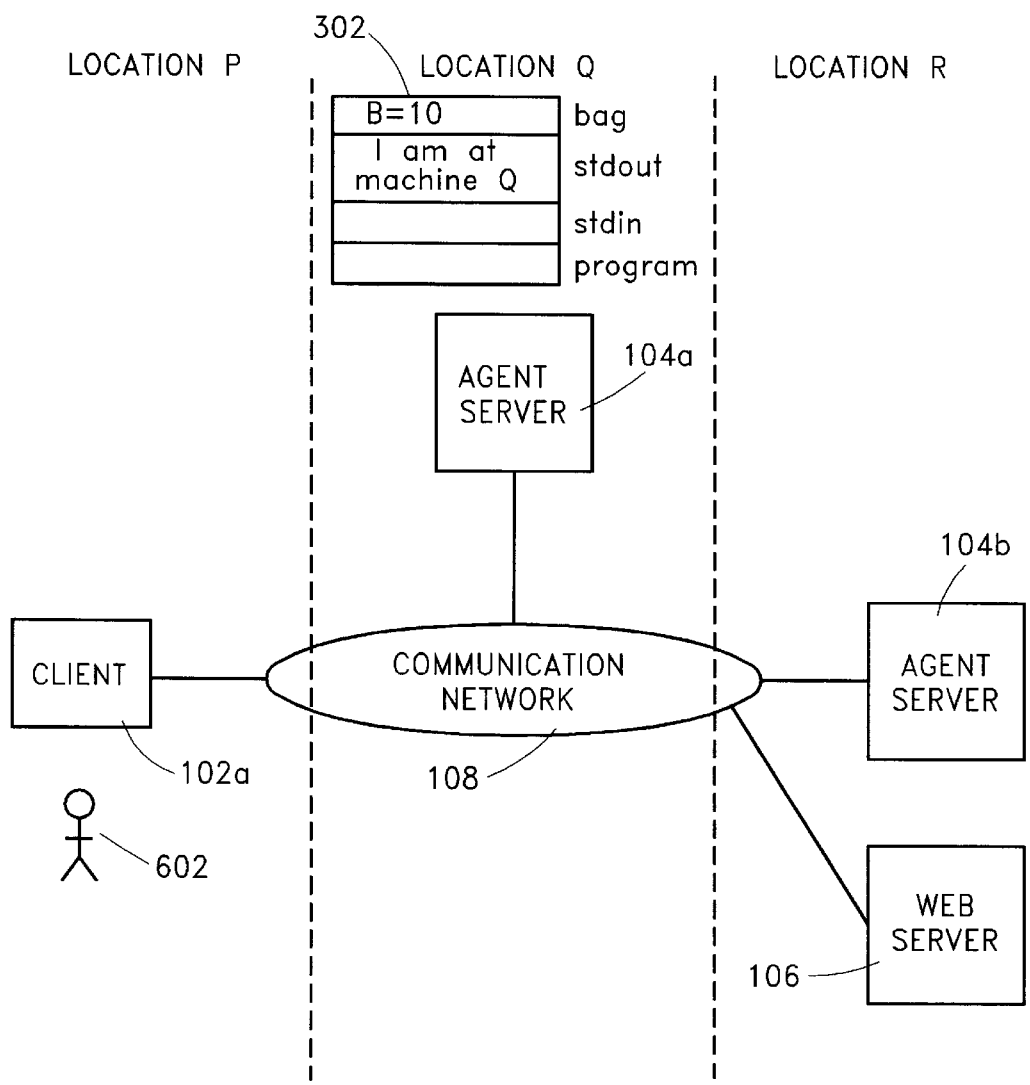

In FIG. 6b, the script executes the PRINT statement at location Q. As a result of execution, the output of the PRINT statement, "I am at machine Q", is added to the STDOUT buffer. Next, the script 302 executes the statement "READ A." Since the value of A is not available in the bag, the script 302 optionally sends notification to the user 602 and waits for a reply. The user notification can be implemented using technology such as a beeper, pager, e-mail, smart phone or handheld portable mobile device. After the user checks the status of the script 302 (as explained with reference to FIG. 5.), the user 602 supplies a value for variable A to the script 302. Additionally, under one optional optimization, the user also supplies a value for variable B to the script 302. Upon receiving these values, the script 302 resumes execution, immediately consuming the value for variable A. Since the value for variable B is not yet needed by the script 302, it is placed in the bag associated with the script 302 (see FIG. 6c). The script 302 then moves to the Agent Server 104b at Location R.

Figure 6D:
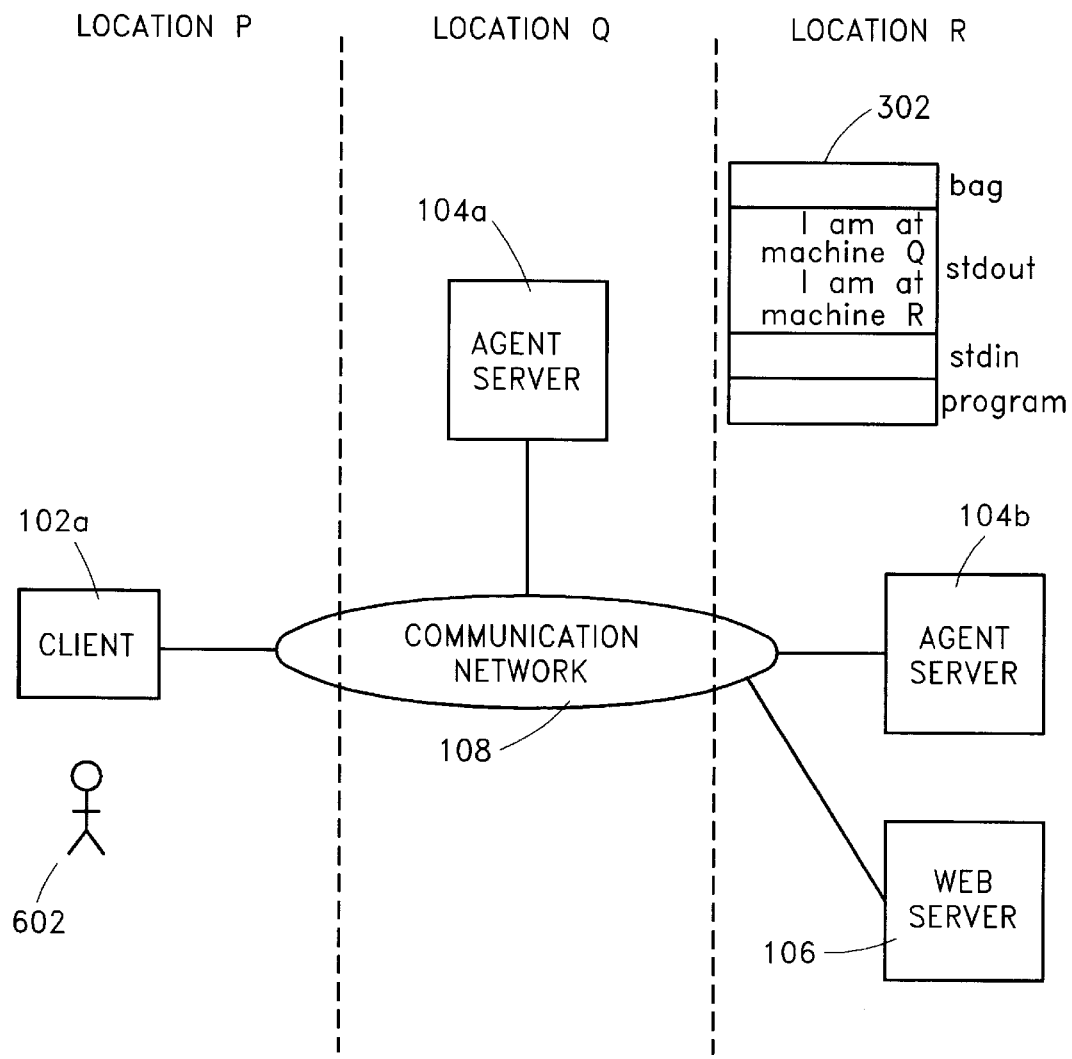

In FIG. 6d, the script 302 generates the output "I am at machine R" as a result of executing the PRINT statement, at location R. The output is attached to the STDOUT buffer of script 302. Next, the script 302 executes the statement "READ B". Since the value for variable B is already available in the bag, the program retrieves the value from the bag and completes execution, without the need for preparing and sending notification to the user. Clearly, more than one additional value can be input by the user and stored in the bag buffer for subsequent use by the program.

Now that the invention has been described by way of a preferred embodiment, various modifications and improvements will occur to those of skill in the art. Thus, it should be understood that the preferred embodiment is provided as an example and not as a limitation. For instance, along with the notification, the contents of the STDOUT buffer 306 can be transmitted to the user's device, assuming the device is capable of receiving such data (e.g., pager or smart phone). In addition, a user, using the system of the present invention, can optionally communicate with a particular AES via e-mail. The scope of the invention is defined by the appended claims.

We claim:

1. In a network comprising a plurality of servers and at least one client device, a method for enabling location independent and location transparent interaction between a program and a user of said at least one client device, said program having been launched at a first location server and having a program state data structure for storing at least the program state, the method comprising the steps of:

initiating, by said user, a program status request for said program to said network;

determining, by at least one of said plurality of servers, a current location server within which said program resides;

checking, in said current location server, said program state to ascertain program status; and enabling interaction between said user and said program based upon said program status.

2. The method of claim 1 wherein said enabling step comprises:

retrieving, from said program for provision to said at least one client device, output contents for display to the user; and displaying, on said at least one client device, said output contents to said user.

3. The method of claim 1 wherein said enabling step comprises:

requesting input variables from said user;

sending any received input values to said current location server; and incorporating said received input values into said program state data structure.

4. The method of claim 1 wherein the program is a mobile agent.

5. The method of claim 1 wherein the program is a mobile script.

6. The method of claim 1 where the user is a mobile user.

7. The method of claim 2 further comprising the step of maintaining an output buffer in said program and wherein said retrieving comprises the step of retrieving said output contents from said output buffer.

8. The method of claim 1 wherein the initiating step comprises the steps of:

initiating said status request at said at least one client device; and forwarding said status request to said first location server.

9. The method of claim 8 wherein said program comprises a mobile program which executes a portion of its code at each of a plurality of execution servers within said plurality of servers and wherein the determining step comprises the steps of:

transmitting said status request to each execution server at which said program has executed a portion of its code; and determining, at each execution server, whether said program is currently running locally.

10. The method of claim 9 wherein each of said plurality of execution servers maintains routing information for said program and wherein said determining further comprises the step, if said program is not currently running locally, of consulting said routing information to ascertain at least one successive execution server to which said program has been routed.

11. The method of claim 1 further comprising the steps of:

maintaining a bag buffer of variable/value pairs in said program;

optionally receiving, from said user, a communication including input values; and temporarily storing said input values in said bag buffer before they are needed by said program.

12. The method of claim 11 wherein said program subsequently searches through contents of said bag buffer to locate needed input values before attempting to request input from said user.

13. The method of claim 1 further comprising the step of maintaining a bag buffer of variable/value pairs in said program and wherein said enabling step comprises the steps of:

searching, in the bag buffer, for input values associated with input variables requested by said program;

updating, if found, said input variables with said input values;

disposing, in an input buffer, said input variables, if not found; and optionally notifying said user via electronic means if no suitable values are found in the bag buffer.

14. The method of claim 13 wherein the electronic means is a pager.

15. The method of claim 13 wherein the electronic means is a beeper.

16. The method of claim 13 wherein the electronic means is electronic mail.

17. The method of claim 13 wherein the electronic means is a smart telephone.

* * * * *